United States Patent [19]

Baudouin et al.

[11] 3,992,217

[45] Nov. 16, 1976

[54] COMPOSITION OF CALCIUM CARBOALUMINATES AND OF TOBERMORITES, PROCESS FOR ITS MANUFACTURE AND ITS APPLICATION

[75] Inventors: Jacques Baudouin, Montelimar; Jean-Pierre Caspar, Le Teil, both of France

[73] Assignee: Lafarge S.A., Paris, France

[22] Filed: Nov. 1, 1974

[21] Appl. No.: 520,102

[52] U.S. Cl. ............................ 106/306; 106/102
[51] Int. Cl.² .................. C04B 7/06; C04B 31/02
[58] Field of Search ........................ 106/306, 102

[56] References Cited
UNITED STATES PATENTS
2,819,172  1/1958  Trief .................................. 106/102

*Primary Examiner*—Winston A. Douglas
*Assistant Examiner*—S. V. Howard
*Attorney, Agent, or Firm*—Ernest F. Marmorek

[57] ABSTRACT

A calcium-alumino composition formed by carbonating at a temperature between about 20° to 100° C, a hydrate of a water paste of an anhydrous calcium-alumino binder and an anhydrous calcium-silico binder formed at a temperature between about 5° and 100° C, said paste having a dry extract of about 5 to 70% by weight.

6 Claims, No Drawings

COMPOSITION OF CALCIUM CARBOALUMINATES AND OF TOBERMORITES, PROCESS FOR ITS MANUFACTURE AND ITS APPLICATION

BACKGROUND OF THE INVENTION

The present invention relates to novel compositions of hydrated calcium carboaluminates and of tobermorites (X CaO, y $SiO_2$, z $H_2O$); the invention also relates to manufacturing processes of these compositions, one of the processes also produces the known mono-carboaluminate which is itself directly usable industrially. In addition, the invention relates to applications of the aforesaid composition, in particular, as charges or as elements of charges used in different industries, such as the production of paper, paints, etc.

Reference is had to applicants' concurrently filed patent application entitled "Manufacturing Process of Mineral Charges, Products Obtained and Their Applications" which relates more particularly to a process featuring the hydration between about 10° and 100° C of one of the synthetic anhydrous calcium aluminates prepared especially or stemming from the manufacture of hydraulic binders, or of refractory cements. The anhydrous calcium aluminate is ground-up to a medium degree of fineness with a quantity of water of such an order of magnitude that a paste is formed with dry extracts being comprised between 5 and 70% by weight, at least the large particles are subjected to a vigorous agitation during the hydration, the suspension formed is dried and the dry powder is collected. It is known that different industrial processes utilize very different charges. Occurring in nature or prepared industrially, which among others are kaolins, calcium silicates, calcium carbonates, calcium silicoaluminates, and calcium sulfates. Applicants have studied the compositions constituted by the hydrates of the calcium carboaluminates, because tests indicated the practical qualities of some of these compounds as charges. As a result of tests and work-projects, applicants have discovered industrial manufacturing processes for the compositions.

SUMMARY OF THE INVENTION.

The manufacturing process of the compositions according to the invention, starting from hydraulic binders and water, is characterized by the fact that, at a temperature between about 5° and 100° C, the complete hydration of the anydrous binder is obtained and furnishes a dry extract of about 5 to 70% by weight, that at a temperature between about 20° and 100° C, the aqueous phase of the hydrates is carbonated by contacting it with a gas containing $CO_2$ or with a compound capable of furnishing $CO_2$, that one dries the carbonated compositions and that one collects the obtained dry carbonated compositions.

The starting materials for the instant invention are anhydrous substances formed by white aluminous cements or their ground-up clinkers which in essence contain soluble monocalcium aluminates and hemicalcium aluminates (CaO. $Al_2O_3$ and CaO. 2 $Al_2O_3$) with more or less of the anhydrous 12 CaO. 7 $Al_2O_3$ and traces of free alumina, or also synthetic, soluble calcium aluminates, such as 3 CaO. $Al_2O_3$.

Depending on the desired reactions, quicklime or slaked lime (CaO or $Ca(OH)_2$) can be used.

White Portland cements or their ground-up clinkers, that is, cements rich in di-, and tri-calcium silicates, can also be utilized as well as suppliers of lime during the hydration step.

Furthermore, the products called "white limes", enriched in di-, and/or tri-calcium silicates, are likewise suitable.

The selected process to be carried out guides the selection of the starting anhydrous substance, depending on whether one desires to stop with the obtainment of the hydrated calcium monocarboaluminate (3 CaO. $Al_2O_3$. $CaCO_3$ 11 to 12 $H_2O$), or through co-precipitation, one intends to obtain a composition of carboaluminate and of tobermorites ($x$ CaO. $y$ $SiO_2$. $z$ $H_2O$, with $0.4<x/y<3$ and $0.5<z/y<6$).

In order to assure carbonation during the process, gaseous $CO_2$, or products producing $CO_3$ — ions, or also residual gases from cement kilns can be used.

The compound of the invention includes, in particular, hydrated calcium mono-carboaluminate: 42 to 97% by weight;
tobermorites ($x$ CaO . $y$ $SiO_2$. $z$ $H_2O$): 58 to 3%, which may contain free hydrated silica in amounts to 0 from 11%, expressed as $SiO_2$.

The invention accordingly comprises the several steps and the relation of one or more of such steps with respect to each of the others, all as exemplified in the following detailed disclosure, and the scope of the application of which will be indicated in the claims. In addition, the novel compositions described from a part of the invention.

DESCRIPTION OF THE PREFERRED EMBODIMENT

In a general way, the invention consists in allowing aluminum, calcium, and silicon ions in solution to react with one another: one starts with a mixture of anhydrous calcium aluminate and anhydrous calcium silicate, allows them to react with water in stoichiometric proportions with respect to the ionic formulation $Ca^{++}$ and $Al^{+++}$ of the selected hydrated carboaluminate (for example mono-carboaluminate), and subsequently one allowed the intermediary hydrates obtained in this manner to react, in the presence of water, with $CO_2$ gas, or the like, having one of the aforementioned origins.

For a selected composition, conforming to the limits indicated above, one would start, according to the instant invention, with any kind of soluble calcium aluminate, either pure or in a mixture, selected among the aluminates: CaO. 2 $Al_2O_3$; CaO. $Al_2O_3$; 12 CaO. 7 $Al_2O_3$; 3 CaO. $Al_2O_3$. One then hydrates the selected substances at a low temperature, preferably at a temperature of less than 35° C, in the presence of a soluble calcium silicate and with an excess of water. The soluble calcium silicate can be selected from among the following: 3 CaO. $SiO_2$, 2 CaO. $SiO_2$, or from among the products containing a calcium silicate, such as the White Portland cements or the "white limes". As a matter of fact, it is known that soluble calcium silicates become hydrated in the presence of water while furnishing, in particular, disposable calcium ions. The reactions combine the calcium ions stemming from this decomposition into hydrated calcium aluminates rich in calcium.

One thus obtains, separately or in the form of a mixture, the following calcium aluminates: 2 CaO. $Al_2O_3$. 8

$H_2O$; 4 $CaO$. $Al_2O_3$. 13 $H_2O$; $CaO$. $Al_2O_3$. 10 $H_2O$; which are either pure or, if one has allowed them to react with a calcium silicate, are present in the form of a mixture with the hydrated calcium silicate in the form of tobermorites.

In other words, one can either start with anhydrous aluminates and silicates, and prepare the intermediary hydrates, or one can take the cited hydrated calcium aluminates, which had been obtained by any means whatsoever. In any case, in order to prepare the mono-carbo-aluminated compound of the invention, it will be necessary to prepare a mixture of hydrated aluminates and calcium ions, or directly prepare the aluminate 4 $CaO$. $Al_2O_3$. 13 $H_2O$, so that the proportions of the available calcium and aluminum ions are in the ratio of 4 $Ca^{++}$ to 2 $Al^{+++}$, that is, the compositions are measured out to yield the following proportions, four parts $CaO$ for one part $Al_2O_3$, so that the compositions react in the stoichiometric proportions in relation to the hydrated calcium mono-carboaluminate.

If desired, one can utilize the soluble calcium or aluminum silicates, in particular those stemming from the Portland or aluminous cements, as a source of the complementary calcium ions. With this mixture being suitably proportioned, one proceeds to the carbonation by wet means and obtains the composition of the invention.

In the following, there are presented different examples of the manufacture of the instant composition. These examples are intended to be non-limiting and all percentages are in parts by weight.

EXAMPLES.

EXAMPLE 1.

A refractory aluminous cement of the following compositon:

| | |
|---|---|
| $SiO_2$ | 0.3% |
| $Al_2O_3$ | 71 % |
| $Fe_2O_3$ | 0.4% |
| $CaO$ | 28 % |
| volatile matters | 0.4% |
| alkaline substances | 0.33% | in which the lime and the alumina are combined in the form of: $CaO$. $Al_2O_3$ and $CaO$. 2 $Al_2O_3$ can be used as a starting compound. Typically, this can be a white, non-polluted cement of an industrial fineness of 3,500 $cm^2/g$ (BLAINE fineness).

The calcium silicate can be a commercial white Portland cement of the following composition:

| | |
|---|---|
| $SiO_2$ | 23.7% |
| $CaO$ | 69.3% |
| $Al_2O_3$ | 2.7% |
| $SO_3$ | 1.19% |
| $Fe_2O_3$ | 0.28% | the balance being other substances and possessing an industrial fineness of 3,200 $cm^2/g$.

This white Portland cement should be hydrated completely in the presence of an excess of water, by a process described in the aforementioned concurrently filed application, or by means of a ball mill, or some known process. This results in a mixture of tobermorites and lime, present respectively in quantities of 57.5% and 42.5%, in the form of an aqueous suspension with 30% dry extract.

Subsequently, 158 parts by weight of the aluminous cement and water are placed into a ball mill having a noncontaminating ball to form a paste with 30% dry extract. The total aggregate should be maintained at a temperature of less than 35° C, and the grinding process is carried out by progressively introducing the aqueous tobermorite and lime dispersion at the rate of 174 parts by weight of the dry mixture. The introduction of the dispersion is carried out progressively over a period of 6 hours. After this time, it can be determined by analytical methods traditionally used by the cement makers, that a mixture of the hydrates, without anhydrous substances, consisting of 78% aluminates 2 $CaO$, $Al_2O_3$, 8 $H_2O$ and of 22% tobermorites is formed. The 174 parts of the mixture of tobermorites and lime obtained from the Portland cement, have reacted with the 158 parts of the anhydrous aluminates to form a mixture of about 358 parts of octahydrated dicalcium aluminate and about 100 parts of tobermorites. To the mixture obtained in this manner, one can add 348 parts by weight of the dry portion of the previously prepared tobermorites and lime mixture.

Thus, there is obtained a mixture of 2 $CaO$. $Al_2O_3$. 8 $H_2O$ with $Ca(OH)_2$ and the tobermorites in the stoichiometrical proportions of four parts $CaO$ for one part $Al_2O_3$.

The grinding operation should be continued for a short time period, for example, for an hour, and then the mixture should be carbonated. For this step, a stream of carbon dioxide ($CO_2$) is introduced into the grinder at a rate of 2 liters per minute and over a period of two hours. At the end of the carbonation step, the intermediary calcium aluminate is completely carbonated. The standard X-ray diffraction analysis has shown, that a mixture of hydrated calcium monocarboaluminate (3 $CaO$ $Al_2O_3$. $CaCO_3$. 11 to 12 $H_2O$) and of tobermorites have been obtained co-associated with one another in an exceptional manner and indisassociable. A precise analysis has shown that the carbonated mixture here is about 568 parts by weight of carbonate and about 300 parts by weight of tobermorites, that is, about 57.5% hydrated calcium mono-carboaluminate and 42% tobermorites. As the starting materials here are industrial products, some quantities of other products, such as calcium carbonate, appear in the carbonated mixture.

The carbonated mixture obtained is in aqueous suspension. The dry powder of this mixture can be obtained by any standard process and this dry powder has the following characteristics:

Appearance: impalpable white powder
Composition: principally present are hexagonal plaquettes of the hydrated calcium mono-carboaluminate (57.5%) and spherical granules of the tobermorites (42.5%)
Whiteness: 94.4%
Granulometry: 100% of the particles are smaller than 10 microns average diameter: 2.5 microns
Loss on firing at 1,000° C: 30.1%
pH of 10% water solution:10.4 pH
True density of product: 2.15 gm per cc

EXAMPLE 2.

For this example, a starting charge is prepared according to the following: an aluminous clinker composed of 98% anhydrous aluminate (3 $CaO$. $Al_2O_3$) is hydrated by agitating a powder of this clinker crushed to 3300 cm$^2$/g with water up to a dry extract of 30%. This is continued in a ball crusher until no anhydrous material is left and then an aqueous solution of white Portland cement hydrated to tobermorites and lime is added. Typically, Portland cement such as 69.3% CaO, 23.7% SiO$_2$, 2.7% Al$_2$O$_3$, 1.19% SO$_3$, 0.28% Fe$_2$O$_3$ is hydrated by a combination of agitation with water and friction such as with a ball crusher, for about 5 hours, measurements being taken to confirm the completion of the hydration. For about 276 parts by weight of aluminous cement, about 133 parts by weight of anhydrous Portland cement hydrated into lime and tobermorites should be added. Approximately 133 parts by weight of Portland cement hydrates to about 174 parts by weight, being 57.5% tobermorites and 42.5% lime. The addition of the hydrated Portland cement does not require any particular precaution. The mixture can be agitated for four hours or crushed in a ball crusher for two hours, to obtain the starting charge.

A water paste having a dry extract of about 30% of the starting charge is formed. This paste is an aqueous suspension of a mixture of 4 CaO. Al O$_3$.n H$_2$O (n being between 10 and 20) and tobermorites and/or silica. At a low temperature, for example at 30° C, a pure carbon dioxide gas CO is bubbled through the parts without agitation. This is continued for about 3 hour. This results in a mixture, according to the invention, principally consisting here of 80% of hydrated calcium mono-carboaluminate and of 20% of tobermorites.

EXAMPLE 3.

For this example, ground-up clinkers of aluminous refractory cement consisting of 98.5% of monocalcium aluminate (CaO Al$_2$O$_3$) is used. A mixture of 340 parts by weight of white Portland cement, such as has been defined in example 1, with 161 parts by weight of this aluminous refractory cement is formed. These substances have a fineness of about 3,000 cm$^2$/g and are mixed in the powder state. Together with water, they were placed into a ball mill with non-contaminating standard balls, this being done in a manner so as to form a paste with a dry extract of about 10%. The total aggregate is maintained at a temperature not exceeding 35° C. The mixture is subjected to a forceful grinding over a period of about 24 hours. After 24 hours, the paste is emptied into a narrow tank or receptacle furnished with a powerful agitating device, and carbonation is carried out by means of carbon dioxide gas under pressure. After 1 hour, a mixture of hydrated calcium monocarboaluminate and of silica gel is obtained. A quantitative analysis has revealed that this mixture approximately contained the following:
  88% of mono-carboaluminate
  10% of silica gel, expressed in SiO$_2$
  2% of different substances (principally calcium carbonate).

Once it had been dried, this material has the following characteristics:
  Appearance: impalpable white powder
  Composition: hexagonal plaquettes of calcium monocarboaluminates and micron-sized granules of hydrated silica
  Dimensions of particles: 50% inferior to 1.7 microns
  Whiteness: 94.5%
  Loss on firing at 1,000° C: 37.4%

This powder has a very great thickening effect with respect to water. As a matter of fact, this composition composed of light plaquettes of an anti-settling nature, and furthermore of silica which transforms itself into gels on contact with water and very quickly furnished gels of high viscosity with water.

The composition of the invention consisting of carboaluminate and of tobermorites, is a particularly interesting charge because of its high degree of fineness, its low density and its unusual optical qualities. Moreover, its dispersions do not settle out. When silica is present, the aqueous solutions furnish gels of practical interest.

Different applications of the compound according to the invention are described in the following:

A. A paste with 22% dry extract by using the charge prepared according to example 3 was formed. This aqueous dispersion has the following characteristics:
  viscosity (BROOKFIELD) at 10 rpm: 8,000 cp
  viscosity (BROOKFIELD) at 100 rpm: 2,200 cp.

This example brings to light the interesting rheological characteristics and the advantages of the thixotropic properties of the charge according to the invention.

B. A coating-preparation for paper having the following formulation was prepared:
  charge obtained in example 1100 parts by weight
  starch (dry) 9 parts
  vinylic latex (dry) 9 parts
  water and additives to provide a viscosity of about 500 centipoises With this preparation, an AFNOR VII paper having a weight of 70 g/m$^2$, a whiteness of 84.8% and an opacity of 80.1% was coated. Onto both surfaces, coatings of 8 g/m$^2$ were deposited and after coating and drying, the following characteristics were measured:
  Whiteness: 91.4 (Elrepho method)
  Opacity: 90.4 (Elrepho method)
  Glossiness: 25.0 (Photocolorimeter)
  Fluorescence: 5.9
  Structure of the coating: microporous
  Tearing
    velocity: in the dry state, in cm per sec., ink no. 3803: 115
  Behavior towards water: ink bringing about delitescence
  ink no. 3803.

This sample illustrates the excellent capabilities of the charge of the invention to furnish excellent coatings for paper.

C. The following paints were prepared:

|  | A | B |
|---|---|---|
| Cellulose thickener at 5% | 7 parts by weight | 7 parts by weight |
| Anionic dispersing agent at 10% | 4 parts by weight | 4 parts by weight |
| Emulsified fatty acid esters at 20% | 8 parts by weight | 8 parts by weight |
| Anti-foaming agent | 0.8 parts by weight | 0.8 parts by weight |
| Water | 10 parts by weight | 10 parts by weight |
| Charge according to example 3 | 20 parts by weight | 0 parts by weight |
| Micro-talc, less than 20 microns | 0 parts by weight | 20 parts by weight |

| -continued | | |
|---|---|---|
| | A | B |
| Barium sulfate | 10 parts by weight | 10 parts by weight |
| Titanium dioxide (rutile) | 10 parts by weight | 10 parts by weight |
| "White spirit" | 2 parts by weight | 2 parts by weight |
| Acrylic emulsion at 50% dry extract | 50 parts by weight | 50 parts by weight |
| Water for desired viscosity | As needed | As needed |

These paints of a pigment/binder ratio of 1.43/1, were loaded with a dense charge, the barium sulfate. After 8 days storage at 25° C, it was noted that the formulation B showed a thick deposit, whereas no deposit showed up in formulation A.

This example illustrates the advantages contributed by the rheological behavior of the aqueous pigment dispersions. Moreover, the paint of the formulation A possesses appreciable characteristics relating to whiteness and to opacity.

Finally, the particular characteristics of the calcium monocarboaluminate obtained as intermediary of the process according to the invention can be found below:

| | |
|---|---|
| Appearance: | White, fine, impalpable powder |
| Constitution: | Principally hydrated calcium monocarbo-aluminate |
| Morphology: | Hexagonal plaquettes of average dimensions of 1-2 microns |
| Granulometry: | 100% passing at 8 microns |
| Whiteness: (photovolts) | $\beta = 94.6$ for $\lambda : 571 m\mu$ |
| Density: | 2.15 |
| Loss on firing at 1,000° C | 42.6% |
| Refractive index: | n = 1.54. |

The charge furnished by the new compound is formed by:
hexagonal plaquettes of hydrated carboaluminate. Slightly dense, in the form of plaquettes, these elements contribute to the lightness, to the adherence, to the covering effect and the imperviousness of the coating.

Finally, the charge according to the invention can be prepared in the form of a dry or wet powder, or in aqueous suspension. It is prepared in white form, and the examples show that it can attain a very high degree of whiteness. Lastly, it is convenient - should it be found necessary in the considered application, to prepare the charge in micron-sized dimensions, as it is obtained by starting with ions in solution.

We wish it to be understood that we do not desire to be limited to the exact details shown and described, for obvious modifications will occur to a person skilled in the art.

Having thus described the invention, what we claims as new and desire to be secured by Letters Patent is as follows:

1. A calcium-alumino composition of hydrated calcium carboaluminates and tobermorites essentially consisting of:
   hydrated calcium mono-carboaluminates: from about 42 to about 87 percent by weight;
   tobermorites ($xCaO . y SiO_2 . z H_2O$ with 0.4 $x/y$ 3 and 0.5 $z/y$ 6): from about 58 to about 3 percent, which may contain free hydrated silica in from about 0 to about 11 percent by weight being counted as $SiO_2$.

2. In a process for the preparation of a calcium-alumino composition comprising the steps of:
   forming a paste with water of an anhydrous calcium-alumino binder having $Al_2O_3$ molecules and an anhydrous calcium-silico-binder having CaO molecules, said binders being substantially in a proportion so that for each $Al_2O_3$ molecule there are four CaO molecules,
   said paste having a dry extract of from about 5 to about 70 percent by weight,
   hydrating said anhydrous calcium-alumino-binder and said anhydrous calcium-silico binder at a temperature between from about 5° to 100° C, and
   carbonating said paste at a temperature from about 20° to 100° C.

3. The process as claimed in claim 2, wherein said carbonation is carried out with carbon dioxide or a compound capable of providing carbon dioxide.

4. The process as claimed in claim 2, further comprising drying and collecting said calcium-alumino composition.

5. A calcium-alumino composition formed by carbonating at a temperature from about 20° to 100° C a hydrate of a paste formed from an anhydrous calcium-alumino-binder having $Al_2O_3$ molecules and an anhydrous calcium-silico binder having CaO molecules combined with water at a temperature from about 5° to 100° C substantially in a proportion so that for each $Al_2O_3$ molecule there are four CaO molecules, said paste having a dry extract of about 5 to 70 percent by weight.

6. The process as claimed in claim 2, further comprising the step of adding CaO or $Ca(OH)_2$ to said paste to supply three or less CaO molecules for each $Al_2O_3$, said anhydrous calcium-alumino binder supplying additional $Al_2O_3$.

* * * * *